UNITED STATES PATENT OFFICE.

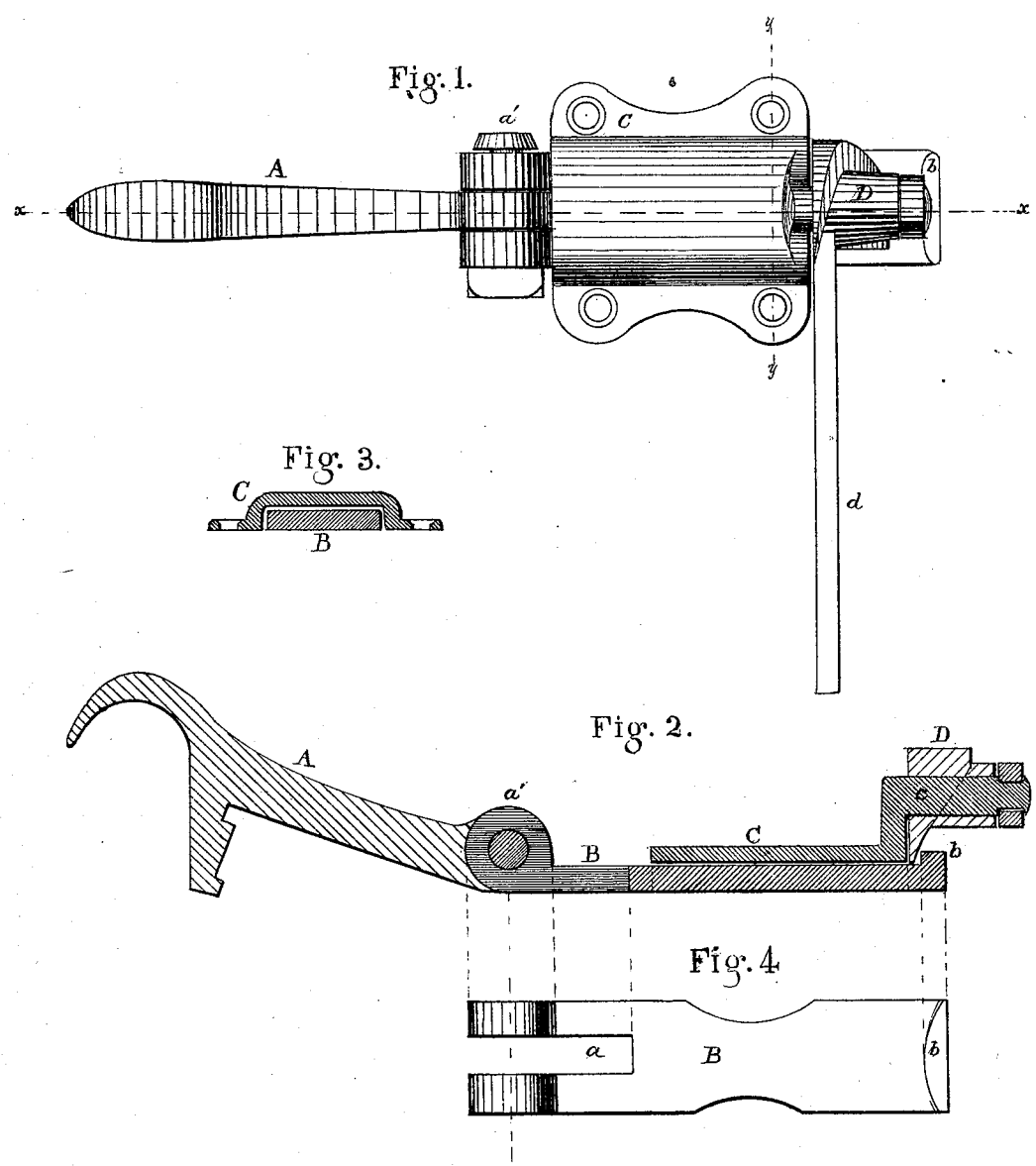

MARCUS BROCKWAY, JR., OF ANGOLA, INDIANA.

IMPROVEMENT IN CARRIAGE-SEAT FASTENERS.

Specification forming part of Letters Patent No. 140,572, dated July 8, 1873; application filed April 12, 1873.

*To all whom it may concern:*

Be it known that I, MARCUS BROCKWAY, Jr., of Angola, Steuben county and State of Indiana, have invented an Improvement in Carriage-Seat Fasteners, of which the following is a full, clear, and exact description, reference being had to the accompanying drawings making a part of this specification, in which—

Figure 1 is a plan view of my invention. Fig. 2 is a side sectional elevation through the line $x\,x$. Fig. 3 is a cross-section on the line $y\,y$. Fig. 4 is a detached view of plate B.

To enable others skilled in the art to make and use my improvement, I will proceed to explain the manner in which I have carried it out.

These fasteners have heretofore been made with a slotted plate secured to a base-plate by means of a headed bolt working in the slot and riveted to the base-plate. The cam which slides the catch has also been caused to work in a slot cut in the base-plate, while the headed bolt and slot have been exposed to view and liable to become filled with dirt so as to obstruct its working.

To simplify the fastener, cheapen its construction, and avoid the liability of its becoming choked with dirt is one object of my improvement; and it consists in using a shoulder on the plate and placing it under cover, thereby also securing a neater finish.

In the drawings, A is the catch secured in the slot $a$ of the plate B by means of the bolt $a'$. The plate B is formed with the shoulder $b$, against which the cam D works, as shown in Fig. 2. The cover C (see Fig. 1) fits snugly over the plate B, and, being secured to the carriage, holds the fastener in position, thereby avoiding altogether the use of a base-plate. The cover C has upon it the arm $c$, on which works the cam D by means of the lever $d$. The arm $c$ is formed with a slight shoulder to prevent the nut, which is riveted on, from binding the cam. Screw-nuts have heretofore been used, but the movement of the cam unscrews the nut and thereby loosens the fastener. Hence I rivet on the nut.

Having thus explained my invention, what I claim as new, and desire to secure by Letters Patent, is—

The plate B, having the shoulder $b$, in combination with the cover C having arm $c$ and cam D, all constructed substantially as and for the purpose set forth.

MARCUS BROCKWAY, JR.

Witnesses:
T. R. MAFFETT,
R. POW.